US008001019B2

(12) United States Patent
Phelan et al.

(10) Patent No.: US 8,001,019 B2
(45) Date of Patent: Aug. 16, 2011

(54) MANAGING ACCESS TO AND UPDATING WAREHOUSE DATA

(75) Inventors: Raymond Joseph Phelan, Troy, IL (US); Douglas William Meyer, Chesterfield, MO (US); Gary Anthony Tonhouse, St. Louis, MO (US); Patrick Lyle Sullivan, Clayton, MO (US)

(73) Assignee: The Boeing Company, Chicago, IL (US)

( * ) Notice: Subject to any disclaimer, the term of this patent is extended or adjusted under 35 U.S.C. 154(b) by 1424 days.

(21) Appl. No.: 11/256,756

(22) Filed: Oct. 24, 2005

(65) Prior Publication Data
US 2007/0094261 A1 Apr. 26, 2007

(51) Int. Cl.
*A01K 5/02* (2006.01)
(52) U.S. Cl. .......... 705/29; 705/2; 705/28; 705/16; 705/26; 705/1; 705/6; 705/10; 705/22; 709/209; 709/229; 709/246; 709/225; 726/6; 726/8; 726/19; 726/3
(58) Field of Classification Search .......... 705/29
See application file for complete search history.

(56) References Cited

U.S. PATENT DOCUMENTS

| 5,261,102 | A | 11/1993 | Hoffman |
| 6,161,139 | A | 12/2000 | Win et al. |
| 6,182,142 | B1 | 1/2001 | Win et al. |
| 6,278,965 | B1 | 8/2001 | Glass et al. |
| 6,339,764 | B1* | 1/2002 | Livesay et al. .......... 705/28 |
| 6,668,322 | B1 | 12/2003 | Wood et al. |
| 6,901,430 | B1* | 5/2005 | Smith .......... 709/206 |
| 7,013,296 | B1 | 3/2006 | Yemini et al. |
| 7,149,806 | B2 | 12/2006 | Perkins et al. |
| 7,194,554 | B1 | 3/2007 | Short et al. |
| 7,194,764 | B2 | 3/2007 | Martherus et al. |
| 7,197,764 | B2 | 3/2007 | Cichowlas |
| 7,203,596 | B2 | 4/2007 | Ledingham et al. |

FOREIGN PATENT DOCUMENTS
WO 9917209 A1 4/1999

OTHER PUBLICATIONS

"Controlling the flow [warehouse automation]." Jul. 2003. Turret Group. SHD Storage - Handling - Distribution , vol. 47 , No. 7, p. 40-1.*
Notification of Transmittal of the International Search Report and the Written Opinion of the International Searching Authority, or the Declaration, Mar. 13, 2007, 10 pgs.

* cited by examiner

*Primary Examiner* — F. Zeender
*Assistant Examiner* — Fawaad Haider
(74) *Attorney, Agent, or Firm* — Armstrong Teasdale LLP

(57) ABSTRACT

Methods, systems, and computer program products manage access to and update warehouse data associated with one or multiple online data systems. A security role is established for each user of warehouse operation functions associated with the online data system. A method involves examining warehouse data and updating a status of warehouse operations, detecting a security role of a current user accessing the data system, and rendering warehouse operation functions and the status via an interface. The method further involves receiving a selection of one of the warehouse operation functions, determining whether the security role of the current user authorizes access to the warehouse operation function selected, and prohibiting access to the warehouse operation function selected in response to determining the security role does not authorize access to the selected warehouse operation function.

17 Claims, 13 Drawing Sheets

Fig. 6

GLOBAL SUPPORT NETWORK - SAT WAREHOUSE

Warehouse Functions: Issue It - Display Groups for Issuing —— 702

| Warehouse Home | Create Pick Lists | Record Picks | Stage For Delivery | Record as In Transit | >Issue It |

Voucher | Program Code | Priority
C17PCAG | 1 (Red)
Submit | Reset

704 —— 707 —— OR click here to Issue Parts.

Inquiry Results

| RESERVE VOUCHER / PROGRAM CODE | ISSUE TO ORDER | REQUEST ID | PART NUMBER | NSN | SERIAL | QUANTITY RESERVED | NEED DATE (YYYY-MM-DD) | PRIORITY | STATUS | |
|---|---|---|---|---|---|---|---|---|---|---|
| 1030043717 / C17PCAG | 940669 | C1730590018 | 17R9Y0971.7001 | NSL | | 1 | 2003-02-28 | 1 | Picked | Not Packed |
| 1030046132 / C17PCAG | 880255 | C1730650037 | 7586395 | 1650-01-430-4096 | | 4 | 2003-03-06 | 1 | Picked | Packed |
| 1030060353 / C17PCAG | 000203 | C1730730060 | 5903150 | 2915-01-391-9862 | | 2 | 2003-03-14 | 1 | Picked | In Transit |
| 1030060354 / C17PCAG | 000203 | C1730730077 | 5903150 | 2915-01-391-9862 | | 2 | 2003-03-14 | 1 | Picked | Packed |
| 1030064760 / C17PCAG | 000203 | C1730830033 | MS15001-1 | 4730-00-050-4203 | | 2 | 2003-03-24 | 1 | Picked | Packed |
| 1030059252 / C17PCAG | 000203 | C1730830034 | MS15001-2 | 4730-00-172-0001 | | 2 | 2003-03-24 | 1 | Not Packed | Not In Transit |
| 1030059259 / C17PCAG | 000203 | C1730830035 | 700444106 | NSL | | 2 | 2003-03-24 | 1 | Picked | Packed |
| 1030059269 / C17PCAG | | | | | | | | | Picked | Not In Transit |

708

"Display Groups for Issuing" Legend: ☐ No Action Required; ▨ Action(s) Required; ■ Immediate Action(s) Required

MANAGING ACCESS TO AND UPDATING WAREHOUSE DATA

TECHNICAL FIELD

The present invention generally relates to limiting access to secured data and, more particularly, relates to methods, computer-readable mediums, and systems for managing access to and updating warehouse data.

BACKGROUND

Warehouse workers may have security clearance to only update selected portions of a secured online data system but do not have input screens with security access that limits their inputs. The lack of input screens with appropriate security access can both limit the inputs of authorized personnel as well as allow access to unauthorized personnel. Certain warehouse functions performed in the secured online data system do not provide enough information or edits to allow the user to make valid entries into the system. At times, several data system screens are needed to complete an update transaction and one of those screens may not be available to an authorized user.

Additionally, some conventional secured online data system software packages are server based and require installation on each personal computer (PC) utilized to update or access the system. Also, printers must be defined to the online data system for hardcopy system prints. These factors, among others, make installation and portability of workstations more complicated and cumbersome for users and administrators.

Accordingly there is an unaddressed need in the industry to address the aforementioned and other deficiencies and inadequacies.

SUMMARY

This Summary is provided to introduce a selection of concepts in simplified form that are further described below in the Detailed Description. This Summary is not intended to identify key features or essential features of the claimed subject matter, nor is the Summary intended for use as an aid in determining the scope of the claimed subject matter.

In accordance with embodiments of the present invention, the above and other problems are solved by methods, systems, and computer program products for managing access to and updating warehouse data. Embodiments of the present invention allow for proper limitation of inputs and security to update only data that specific workers are allowed or authorized to update. Input screens are presented in a logical manner that is meaningful to a user based on a security role granted to the user. Also, edits and valid choices are presented to users so that incorrect inputs and/or errors are minimized. Warehouse data is presented on web pages in a consistent manner via a web based system that allows for fewer setups and the use of printers defined locally to personal computers utilized by workers.

One embodiment is a computer-implemented method for managing access to and updating warehouse data associated with one or multiple online data systems. A security role is established for each user of warehouse operation functions associated with an online data system. The method involves examining warehouse data and updating a status of warehouse operations, detecting a security role of a current user accessing the data system, and rendering warehouse operation functions and the status via an interface over the web. The method further involves receiving a selection of one of the warehouse operation functions, determining whether the security role of the current user authorizes access to the warehouse operation function selected, and prohibiting access to the warehouse operation function selected in response to determining the security role does not authorize access to the selected warehouse operation function.

Another embodiment is a computer program product comprising a computer-readable medium having control logic stored therein for causing a computer to manage access to and update warehouse data associated with at least one online data system. A security role is established for each user of warehouse operation functions for the online data system. The control logic includes computer-readable program code for causing the computer to examine warehouse data and update a status of warehouse operations, detect a security role of a current user accessing the data system, and over the web render one or more warehouse operation functions and the status via an input screen. The control logic also includes computer-readable program code for causing the computer to receive a selection of one of the warehouse operation functions, determine whether the security role of the current user authorizes access to the warehouse operation function selected, and tailor and render a second input screen based on the security role and the warehouse operation function selected in response to determining the security role does authorize access to the warehouse operation function selected. The second input screen excludes warehouse operation functionality irrelevant or inaccessible to the current user based on the security role.

Still another embodiment is a computer-implemented system for managing access to and updating warehouse data associated with at least one online data system. A security role is established for each user of warehouse operation functions associated with the online data system. The system includes an online data system server housing the online data system, a web server communicatively associated with the online data system server, and a remote computer including a display screen, the remote computer communicatively associated with the web server over a network. The web server is operative to examine warehouse data and update a status of warehouse operations, detect a security role of a current user accessing the warehouse data, and render via the display screen one or more warehouse operation functions and the status. The web server is also operative to receive a selection of one of the warehouse operation functions via the remote computer, determine whether the security role of the current user authorizes access to the warehouse operation function selected, and tailor and render one or more input interfaces via the display screen based on the security role. The input screens exclude warehouse operation functionality irrelevant to or inaccessible to the current user based on the security role.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 6 illustrates another receipt of stock input screen display utilized in an illustrative embodiment of the invention;

FIG. 7 illustrates an issuing of stock input screen display utilized in an illustrative embodiment of the invention;

FIG. 9 illustrates a shipping input screen for creating pick lists utilized in an illustrative embodiment of the invention;

FIG. 10 illustrates an input screen for adding dimensions for a shipping group utilized in an illustrative embodiment of the invention;

FIG. 11 illustrates another shipping input screen utilized in an illustrative embodiment of the invention.

DETAILED DESCRIPTION

As described briefly above, embodiments of the present invention provide methods, systems, and computer-readable mediums for managing access to and updating warehouse data associated with one or more online data systems. In the following detailed description, references are made to accompanying drawings that form a part hereof, and in which are shown by way of illustration specific embodiments or examples. These illustrative embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
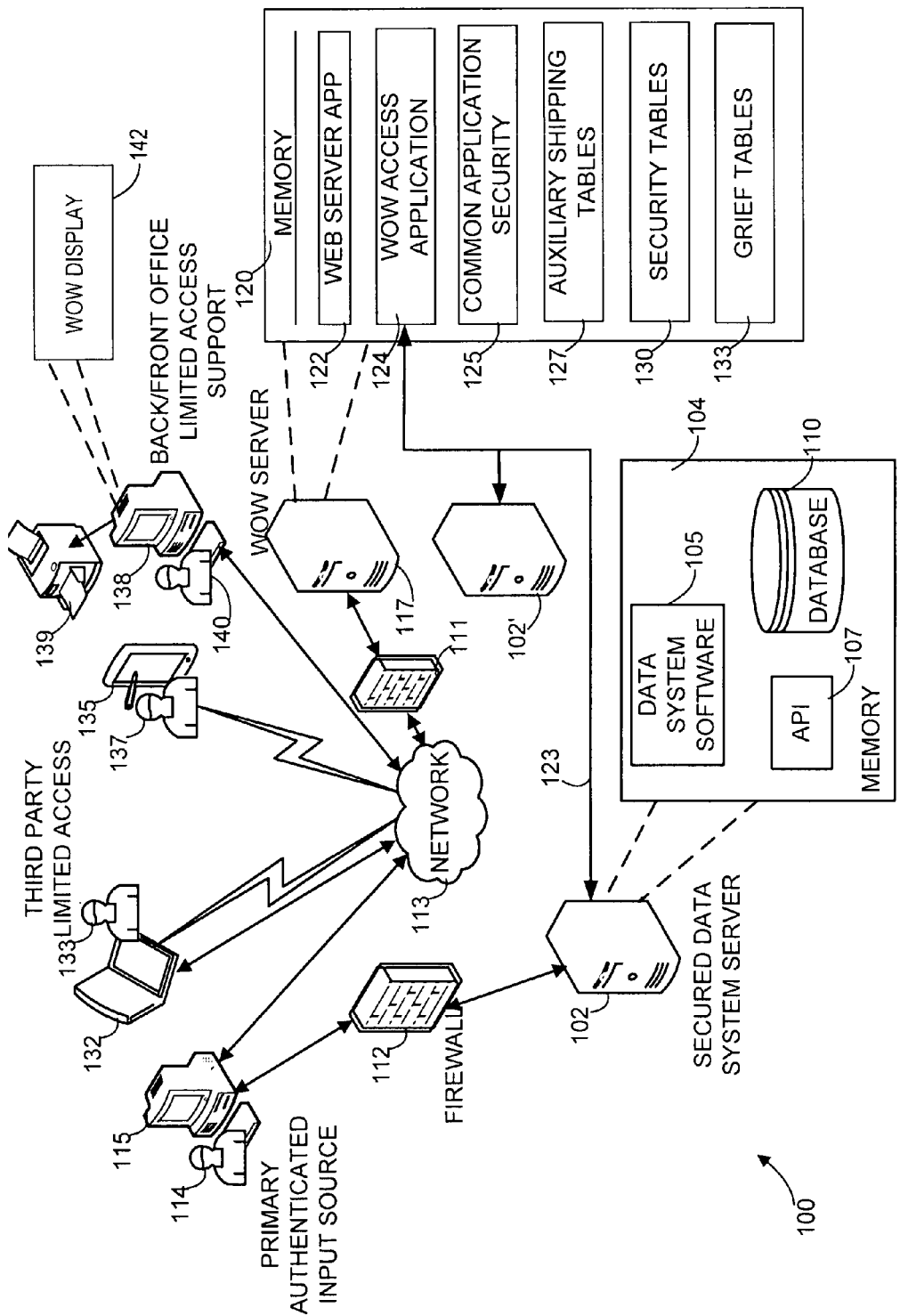
FIG. 1 is a schematic diagram illustrating aspects of a networked operating environment utilized in an illustrative embodiment of the invention.
Figure 2:
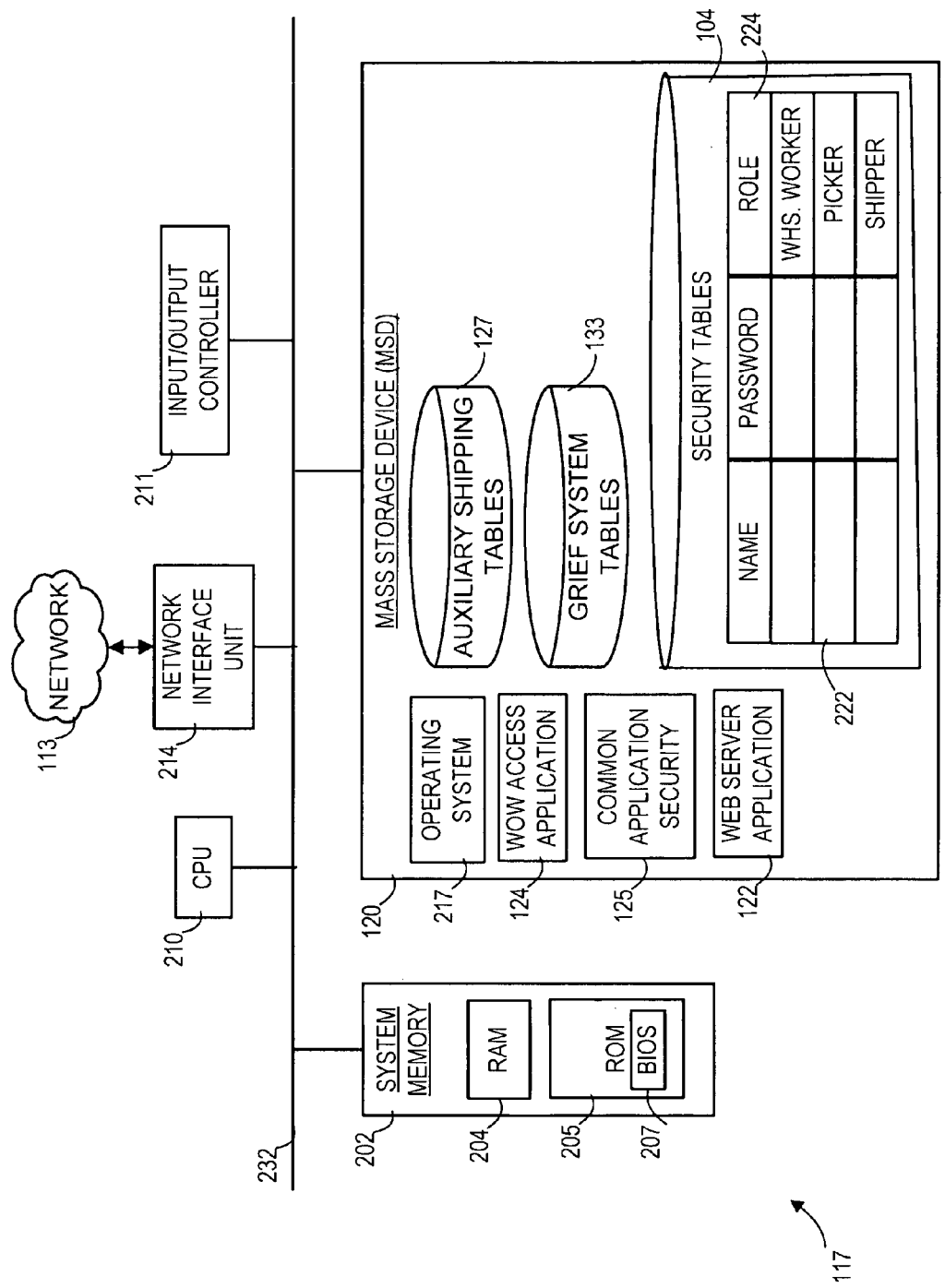
FIG. 2 illustrates computing system architecture for a warehouse on web (WOW) server computer utilized in an illustrative embodiment of the invention.

Referring now to the drawings, in which like numerals represent like elements through the several figures, aspects of the present invention and the illustrative operating environment will be described. FIGS. 1-2 and the following discussion are intended to provide a brief, general description of a suitable computing environment in which the embodiments of the invention may be implemented. While the invention will be described in the general context of program modules that execute in conjunction with a BIOS program that executes on a personal or server computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a schematic diagram illustrating aspects of a networked operating environment 100 utilized in an illustrative embodiment of the invention will be described. As shown in FIG. 1, the networked environment 100 includes a data system server 102 secured by a firewall 112, a workstation 115 serving as an authenticated input source for the data system server 102, and another data system server 102'. The networked operating environment 100 also includes a warehouse on web (WOW) server 117 secured by a firewall 111 and communicatively associated with other network components over a network 113, a laptop computer 132, a tablet PC 135, and a PC 138 with a printer 139. Stored on a memory 104 of the data system server 102 is a data system application 105 for operating and updating the online data system, a primary database 110 for storing, among other data, warehouse data, and an application program interface (API) 107 for receiving updates to the database 110 from the WOW server 117 over the network 113 over a dedicated communication line 123.

Stored on a memory 120 of the WOW server 117 is a web server application 122, a WOW access application 124, a common security application 125 for securing one or more applications and data residing on or associated with the WOW server 117, and security tables 130 for use in conjunction with the common security application 125. The memory 120 also includes auxiliary shipping tables 127 for storing a local duplicate of warehouse data stored in the database 110 and grief tables 133 for identifying warehouse items that cannot be received into the primary database 110. The WOW access application 124 generates unique web pages that allow internal, third party, and back and front office workers to view and/or update warehouse information on the primary database 110 and the auxiliary shipping and grief tables 127 and 133. These web pages are rendered for display over the network 113 to the workers or users via interface displays, such as a WOW display 142 of the PC 138. The workers perform daily task via the web pages, such as inventory receipts, inventory inspections, inventory put-away on the shelves, and movement of inventory within the warehouse. Other tasks include picking, packing, and shipping or issuing parts from the unique web pages that are tailored to various security roles of the workers.

For instance, an internal worker 114 using the workstation 115 and may have full access to the data system server 102 for viewing and updates. As the primary authenticated input source, the workstation 115 may access the data server directly or via web pages presented by the WOW server 117. In contrast, a third party worker, such as workers 133 and 137 may be assigned different security roles depending on their tasks. For instance, the worker 133 could have a warehouse worker security role granting access via the laptop 132 to all warehouse functions. Similarly, the worker 137 could have a shipping worker or quality inspector security role granting limited access via the wireless tablet PC 135 to the warehouse functions. Still further, back and front office workers, such as a worker 140 may have a limited or full access security role depending on their responsibilities, such as customer service or supply chain operations. Additional details regarding security roles and corresponding access to warehouse data and functions will be described below with respect to FIG. 2.

The web pages facilitate a method of controlled updates to the database 110 via the API 107 by way of the WOW server 117. The use of web based PCs or wireless tablet PCs with internet access to WOW input screens provides user-friendly access for workers who use their PC or tablet to view data, update the database 110, and print labels or pick lists to local printers, such as the printer 139 defined to the PC 138. Additional details regarding the warehouse functions and access will be described below with respect to FIGS. 3-12.

FIG. 2 illustrates computing system architecture for the WOW server 117 utilized in an illustrative embodiment of the invention. The WOW server 117 includes a central processing unit (CPU) 210, a system memory 202, and a system bus 232 that couples the system memory 202 to the CPU 210. The system memory 202 includes read-only memory (ROM) 205 and random access memory (RAM) 204. A basic input/output system 207 (BIOS), containing the basic routines that help to transfer information between elements within the WOW server 117, such as during start-up, is stored in ROM 205. The WOW server 117 further includes memory such as the mass storage device (MSD) 120 for storing an operating system 217 such as WINDOWS XP, from MICROSOFT CORPORATION of Redmond, Wash., the WOW access application 124, the web server application 122, the common security application 125, and security tables 130 that include a profile 222 for each user where each profile designates a security role 224. The MSD 120 also includes auxiliary shipping tables 127 for storing a local duplicate of warehouse data stored in the database 110 and grief tables 133 for identifying warehouse items that cannot be received into the primary database 110.

It should be appreciated that the MSD 120 may be a redundant array of inexpensive discs (RAID) system for storing data. The MSD 120 is connected to the CPU 210 through a mass storage controller (not shown) connected to the system bus 232. The MSD 120 and its associated computer-readable media, provide non-volatile storage for the WOW server 117. Although the description of computer-readable media contained herein refers to a MSD, such as a hard disk or RAID array, it should be appreciated by those skilled in the art that computer-readable media can be any available media that can be accessed by the CPU 210. The CPU 210 may employ various operations, discussed in more detail below with reference to FIG. 12 to provide and utilize the signals propagated between the WOW server 117 and data system servers 102 and 102' (FIG. 1). The CPU 210 may store data to and access data from the MSD 120. Data is transferred to and received from the MSD 120 through the system bus 232. The CPU 210 may be a general-purpose computer processor. Furthermore, as mentioned below, the CPU 210, in addition to being a general-purpose programmable processor, may be firmware, hard-wired logic, analog circuitry, other special purpose circuitry, or any combination thereof.

According to various embodiments of the invention, the WOW server 117 operates in a networked environment, as shown in FIG. 1, using logical connections to remote computing devices via network communication, such as an Intranet, or a local area network (LAN). The WOW server 117 may connect to the network 113 via a network interface unit 214. It should be appreciated that the network interface unit 214 may also be utilized to connect to other types of networks and remote computer systems. The WOW server 117 may also include an input/output controller 211 for receiving and processing input from a number of other devices, including a keyboard, mouse, or electronic stylus (not shown). Similarly, an input/output controller 122 may provide output to a printer, or other type of output device. The input/output controller may also receive input via other input devices. A computing system, such as the WOW server 117, typically includes at least some form of computer-readable media. Computer readable media can be any available media that can be accessed by the WOW server 117. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, disk drives, a collection of disk drives, flash memory, other memory technology or any other medium that can be used to store the desired information and that can be accessed by the WOW server 117.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
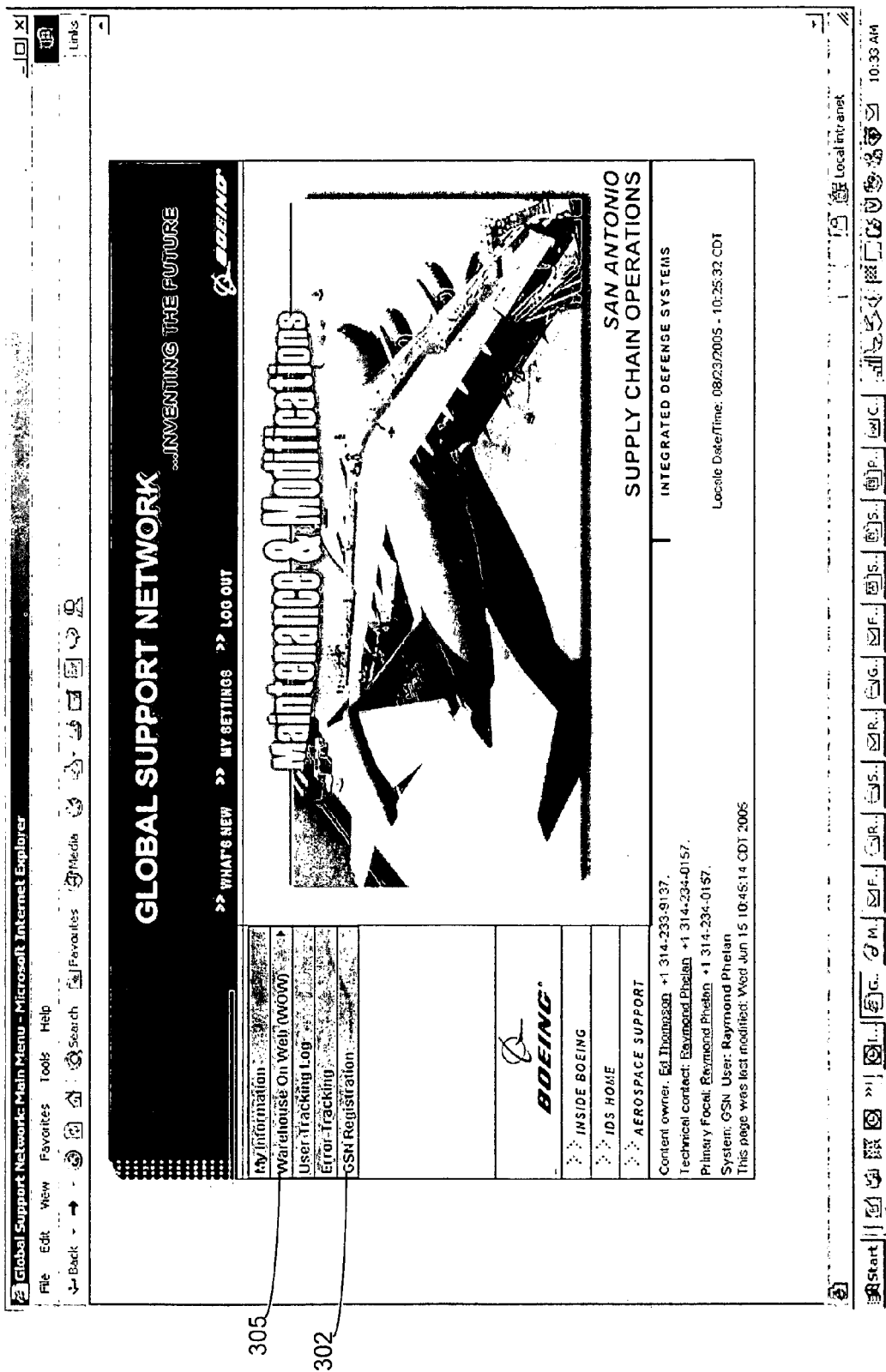
FIG. 3 illustrates an interface display utilized in an illustrative embodiment of the invention for accessing a WOW application program.

FIG. 3 illustrates an interface display 300 utilized in an illustrative embodiment of the invention for accessing a WOW access application 124. Users of a Global Support Network (GSN) are able to access the WOW access application 124 by selecting a WOW access button 305 after registering and obtaining a security role via a GSN registration button 302. Additional functions or features of the WOW access application 124 accessible via web pages will be described below with respect to FIGS. 4-11.

Figure 4:
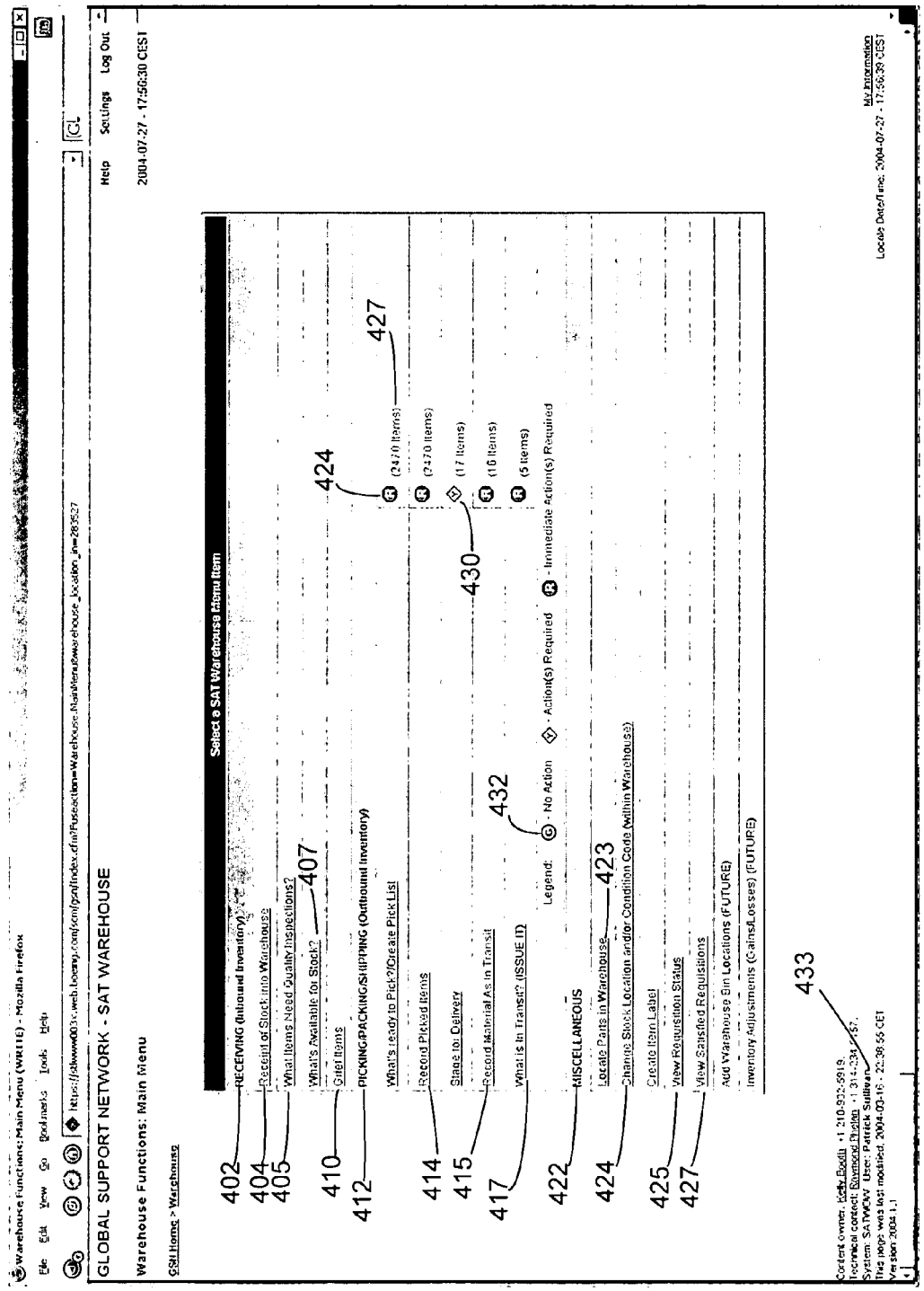
FIGS. 4 and 4a illustrate a main menu interface display and a read-only screen display, respectfully, utilized in an illustrative embodiment of the invention.

FIG. 4 illustrates a main menu interface display 400 utilized in an illustrative embodiment of the invention. The display 400 includes a variety of sections representing groupings of warehouse functions such as a receiving inbound inventory section 402, a picking, packing, and/or shipping outbound inventory section 412, and a miscellaneous section 422. In the present embodiment, all workers regardless of their security role are able to view all of the warehouse functions and status parameters even though a security role may not grant access to all warehouse functions. The receiving section 402 includes a variety of warehouse function selection links such as a receipt of stock selection 404, a quality inspection selection 405, an available for stock selection 407 identifying items available for stocking, and a grief items selection 410 for recording items that cannot be received into the database 110.

Similarly, the shipping section 412 includes, among other selection functions, a record picked items selection 414, and an issuing selection 417. Adjacent to each selection in the shipping section 412 are status indicators updating a worker on priority and count associated with the various warehouse functions. The status indicators include an immediate action required indicator 424, a count indicator 427 identifying the number of items associated with an adjacent shipping selection, an action required indicator 430, and a no action required indicator 432. These indicators assist the various workers in executing their responsibilities in priority order.

The miscellaneous section 422 includes a locate parts selection 423, a change stock location/condition selection 424, a view requisition status selection 425, and a view satisfied requisitions selection 427. A user 433 is also identified in the display view 400. The user 433 has a security role identified as one of the following based on a work responsibility role of the user:

1. a warehouse worker authorized to access all warehouse operation functions accordingly having access to all warehouse functions rendered via the display 400;

2. a quality inspector authorized to record parts needing inspection accordingly having access to the quality inspection selection 405;

3. a warehouse stocker authorized to record a final bin location of a part accordingly having access to at least the available for stock selection 407;

4. a warehouse picker of parts authorized to record parts as picked accordingly having access to at least the record picked items selection 414;

5. a warehouse shipper of parts authorized to record shipment information accordingly having access to at least a record material as in transit selection 415;

6. a warehouse issuer of parts authorized to perform an issue of part transaction accordingly having access to at least the issuing selection 417; and 7. a warehouse data viewer authorized to view one or more warehouse data screens without update authorization.

The user 433 may also serve as a customer service rep or a supply chain operations rep with access to appropriate warehouse functions to perform assigned duties. When a user selects a function to which the security role of the user does not grant access, then the WOW access application 124 renders a read-only notice via the display 142. Additional details regarding various input screens will be described below with respect to FIGS. 5-11.

Figure 4A:
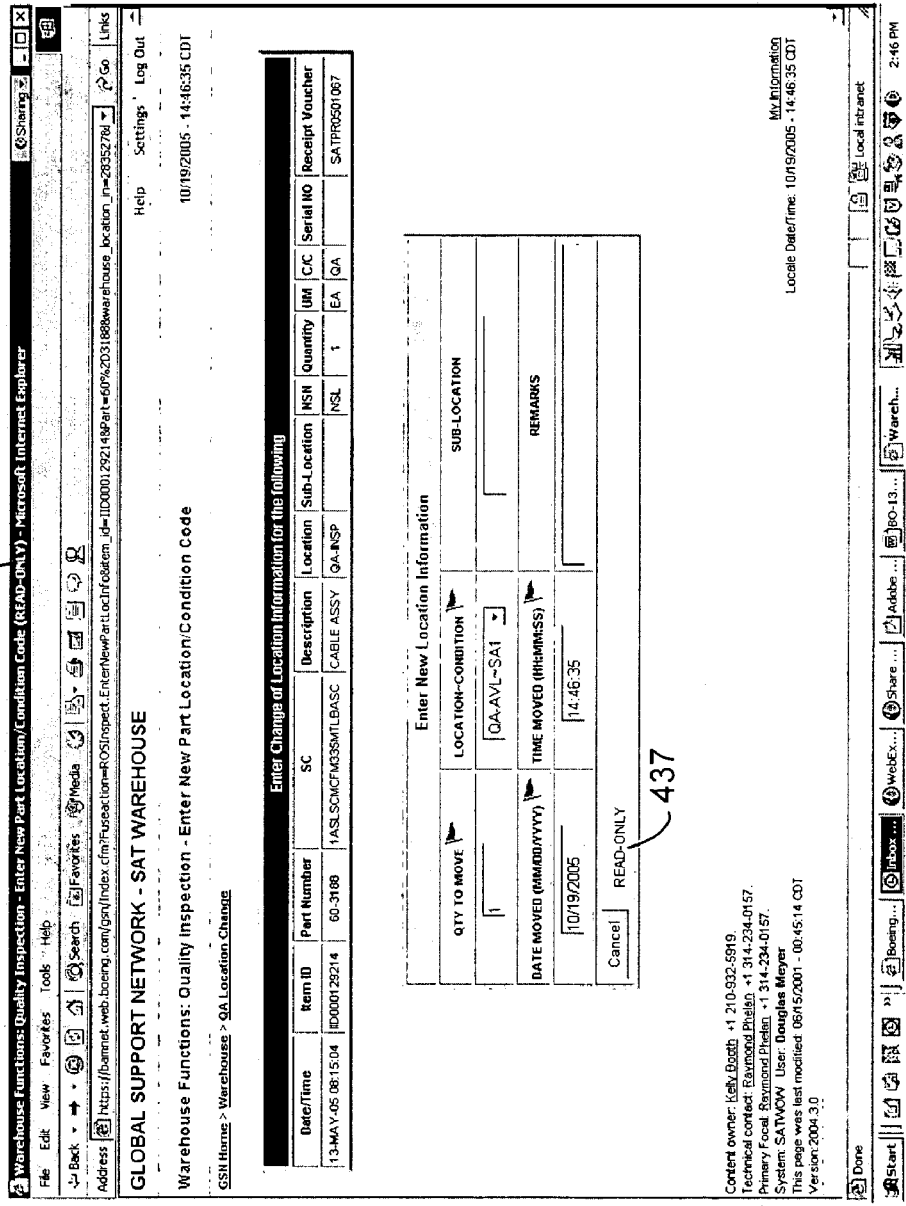

FIG. 4a illustrates a read-only screen display 435 utilized in an illustrative embodiment of the invention. The read-only display 435 includes read-only notices 437 and 440 to alert the user that the function selected cannot be performed because the user is not authorized to perform the selected function.

Figure 5:
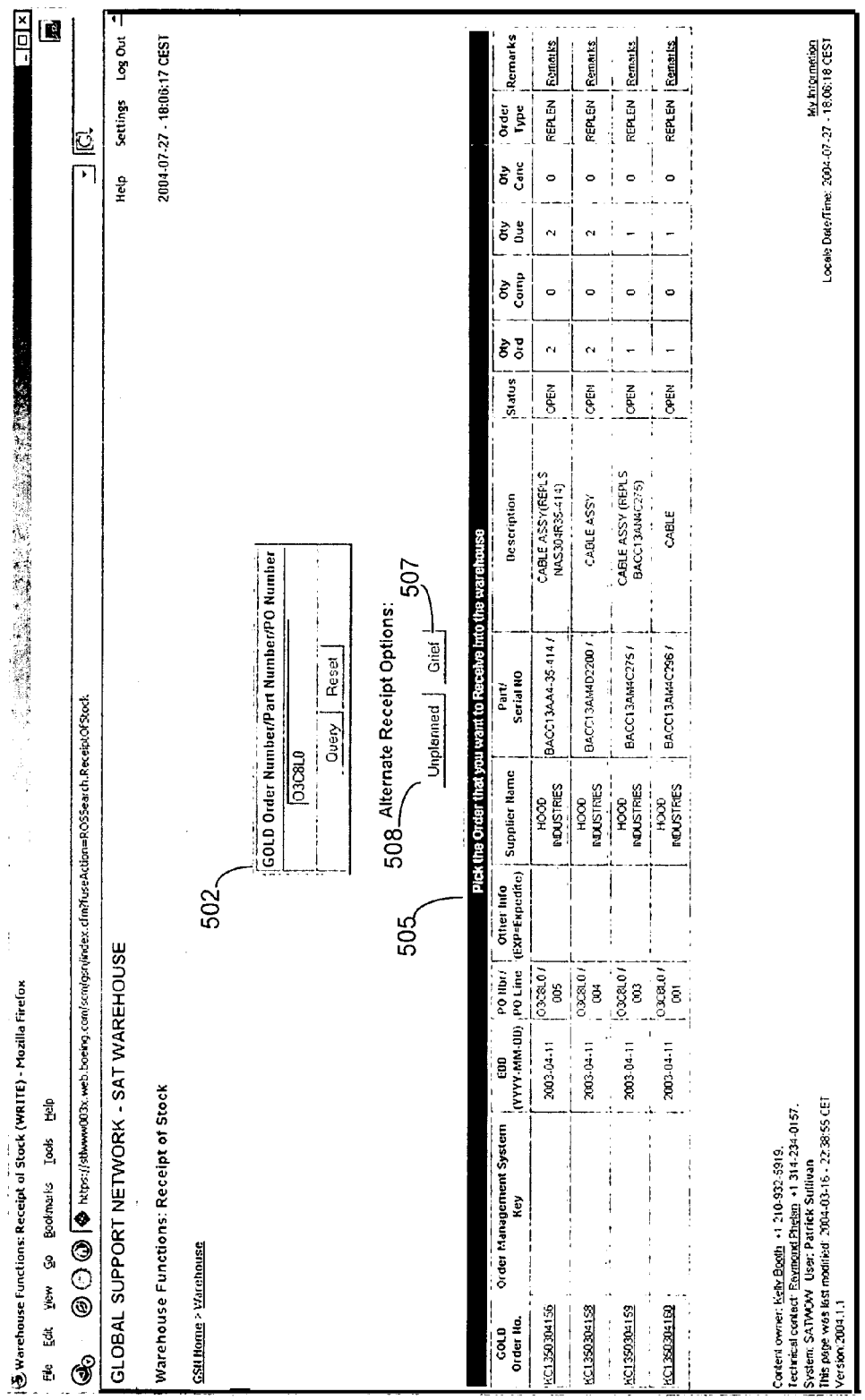
FIG. 5 illustrates a receipt of stock input screen display utilized in an illustrative embodiment of the invention.

FIG. 5 illustrates a receipt of stock input screen display 500 utilized in an illustrative embodiment of the invention. The input screen 500 in accessed from the receipt of stock selection link 404 and includes an entry field 502 for locating an order for receipt by inputting an order, part, or purchase order number. The input screen 500 also includes access to select and update the database 110 with an order for receipt into a warehouse. Additionally, the input screen 500 includes link buttons for unplanned receipts of stock and stock not capable of being received such as the unplanned button 508 and the grief button 507.

Figure 6:
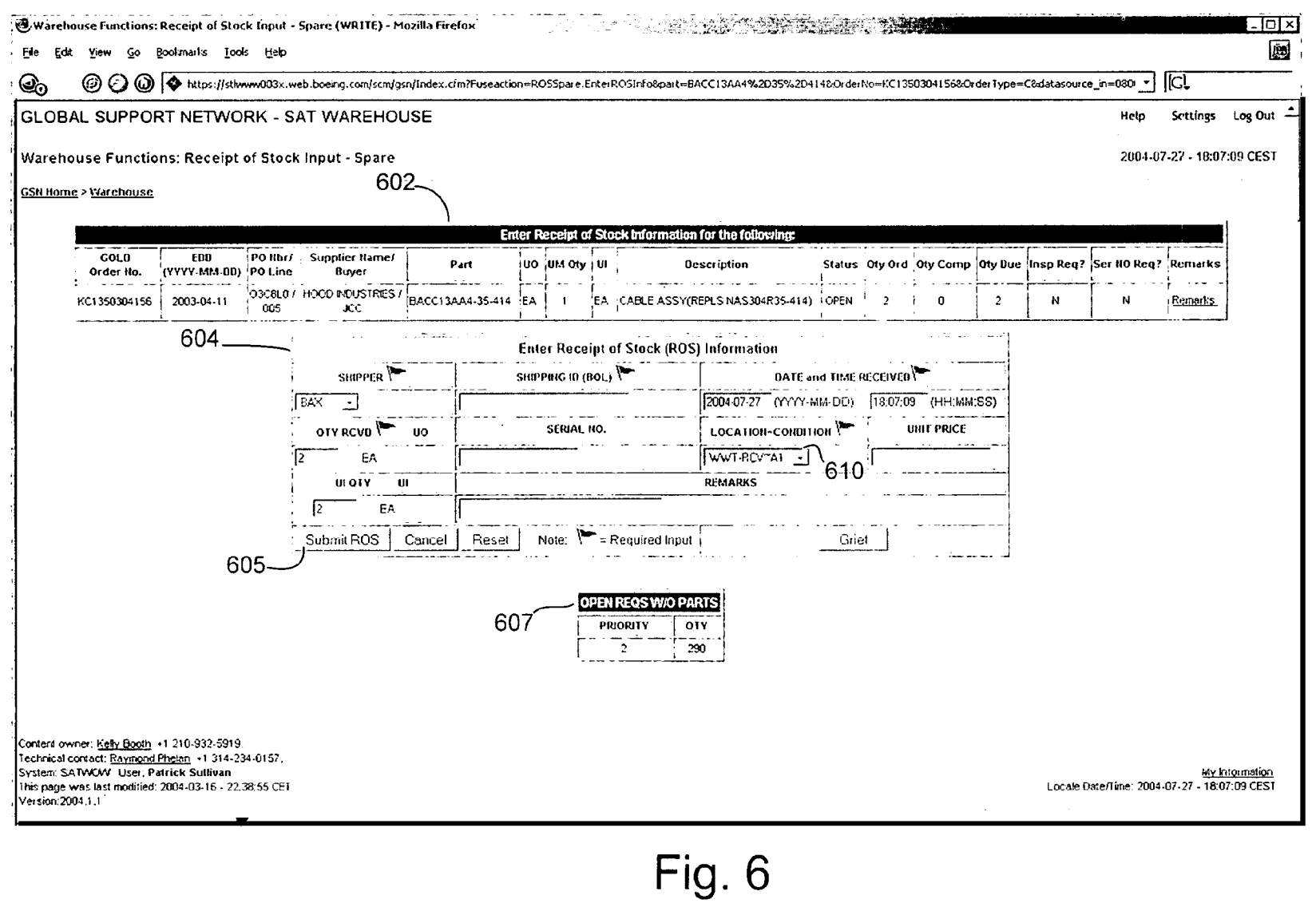

FIG. 6 illustrates another receipt of stock input screen display 600 utilized in an illustrative embodiment of the invention. The input screen 600 is also accessed from the receipt of stock selection link 404 and includes an order display 602 showing an order for which information is to be input, an information input section 604 for receiving and updating warehouse data, and a submit button 605 for submitting the input data to tables and the database 110. Specifically, the input section 604 includes a location-condition input field 610 with predetermined selections for location so that entry errors are kept at a minimum. A warehouse stocker worker would have a security role authorizing access to update the location-condition input field 610. It should be appreciated that although some security roles may view the input screen 600, those without authorization to update will either receive a read-only notice upon attempts to submit updates or the submit button 605 will not be present in an unauthorized view. The input screen 600 also includes an open requisition status block 607 for informing a user of open requisition status.

FIG. 7 illustrates an issuing of stock input screen display 700 utilized in an illustrative embodiment of the invention. The input screen 700 includes a warehouse function indicator 702 displaying the function, an issue block 704 for receiving and submitting inquiries for items to be issued by voucher number, program code and priority, and a link 707 to issue parts found by the inquiry. The input screen 700 also includes a status section 708 indicating whether parts are picked, packed, or in transit and a color-coded priority status of issuing the part.

Figure 8:
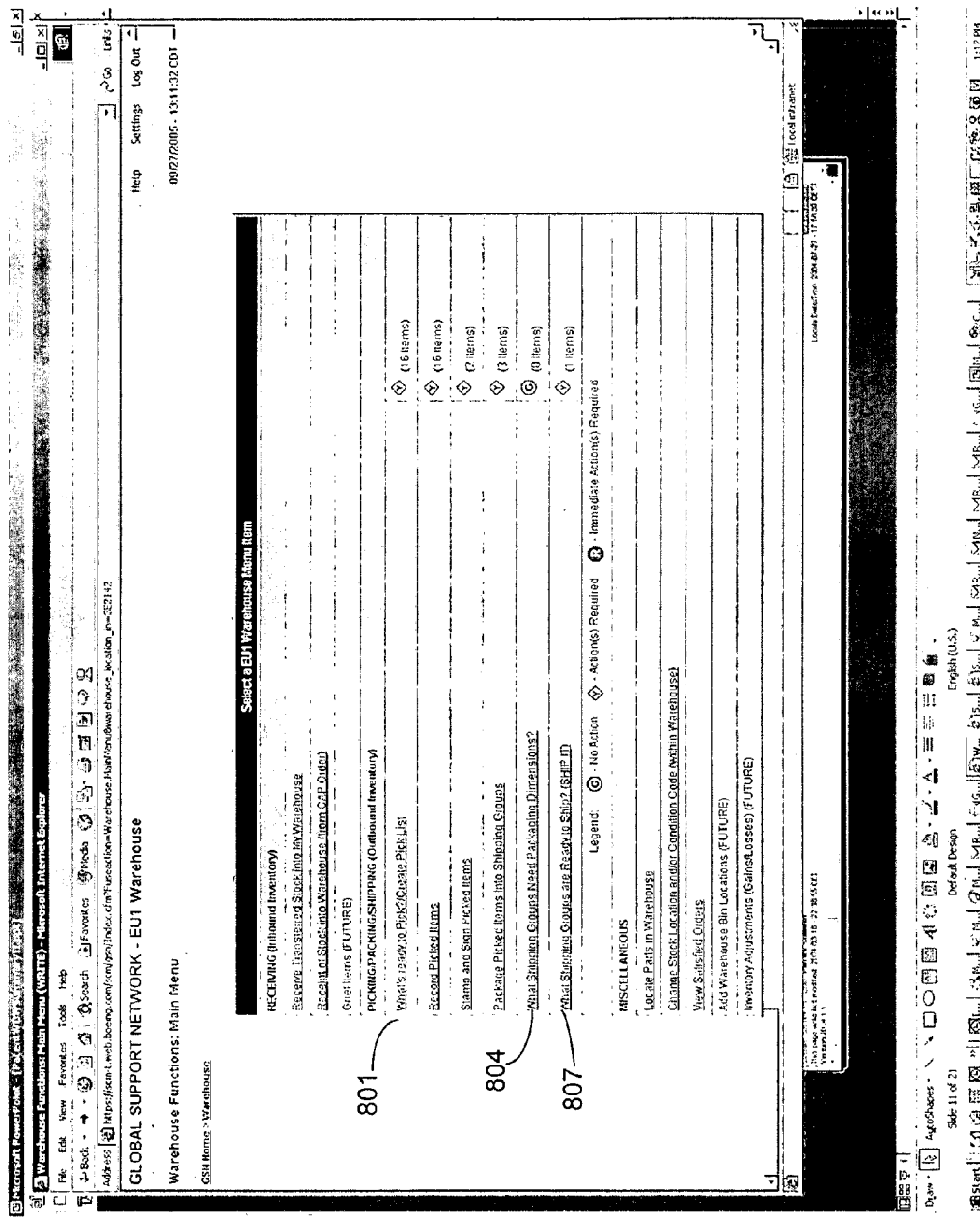
FIG. 8 illustrates an alternative main menu interface display utilized in an illustrative embodiment of the invention.

FIG. 8 illustrates an alternative main menu interface display 800 utilized in an illustrative embodiment of the invention. The main menu display 800 is similar to the display 400 with some differences. Notably, the display 800 represents a different warehouse and does not include a selection link for quality inspection. The differing view may be due to a different security role for the user. The display 800 includes a create pick list selection 801, a packaging dimensions selection 804, and a shipping selection 807.

Figure 9:
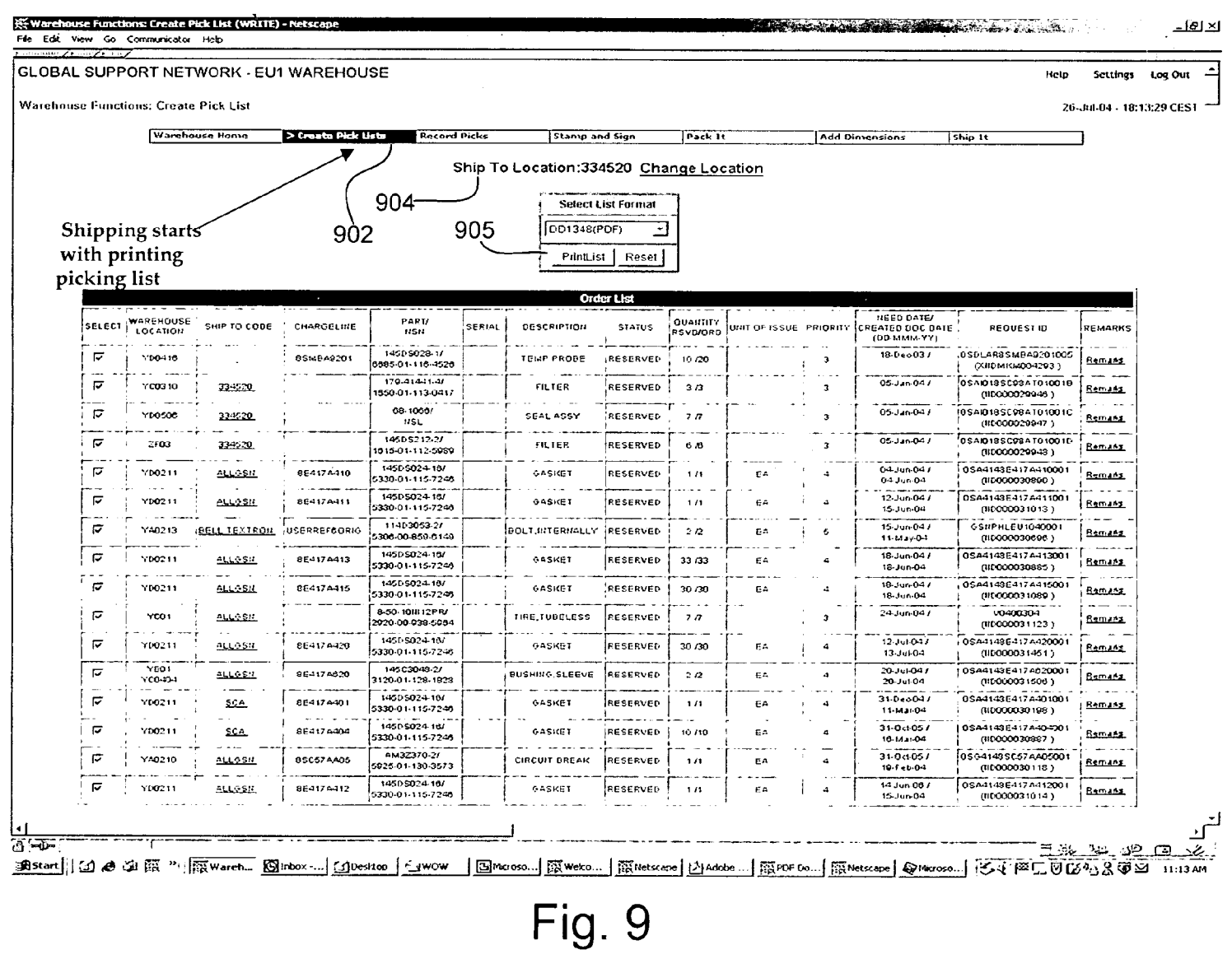

FIG. 9 illustrates a shipping pick ticket input screen 900 for creating pick lists utilized in an illustrative embodiment of the invention. The pick ticket input screen 900 is accessed via the pick list selection 801 and includes an indicator bar 902 indicating a present selection of warehouse function. The input screen 900 also renders a ship to location 904 with a link to change the location and a predetermined list of formats 905 for choosing a format to print the pick list.

Figure 10:
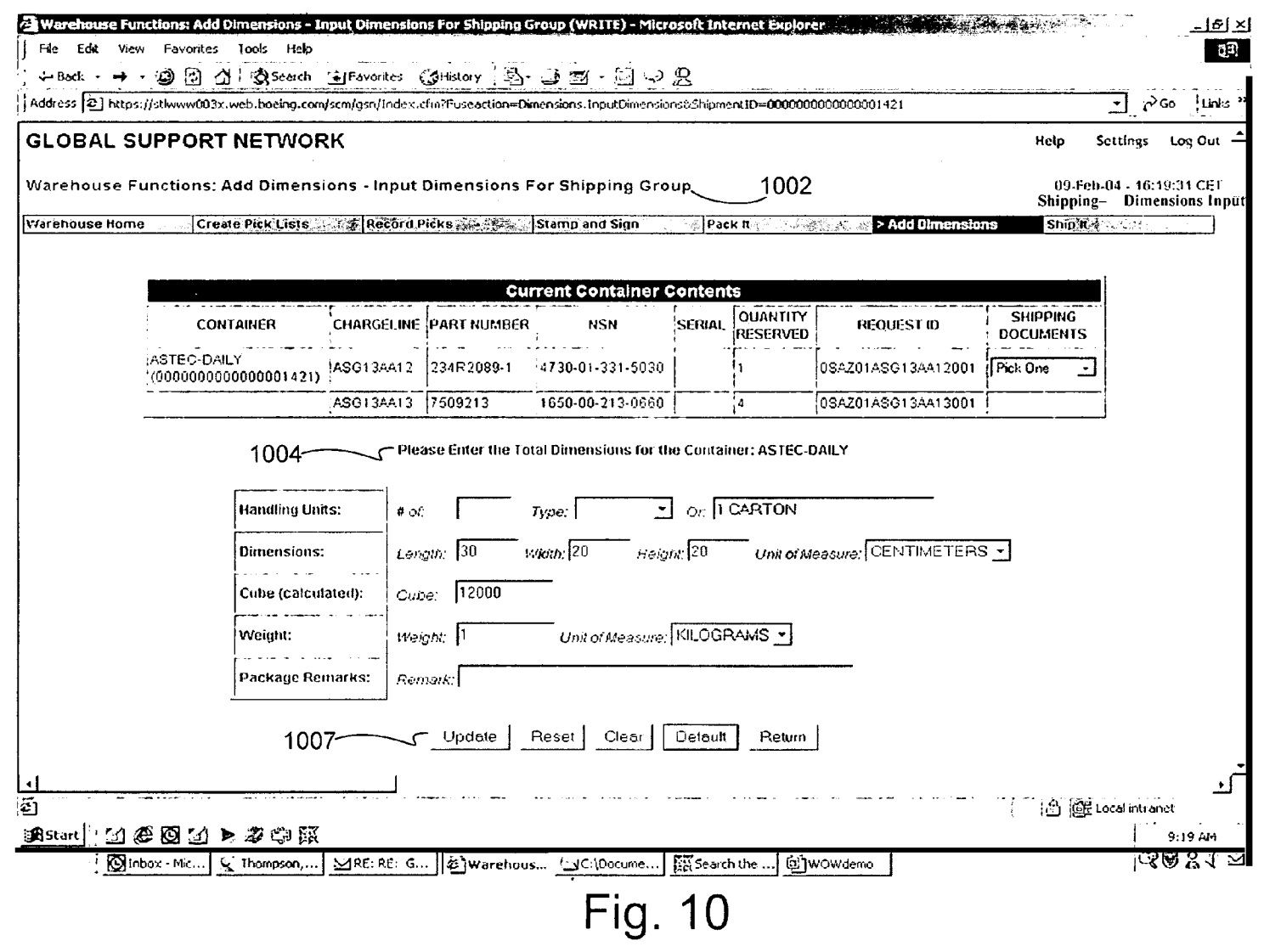

FIG. 10 illustrates an input screen 1000 for adding dimensions for a shipping group utilized in an illustrative embodiment of the invention. The input screen 1000 is accessed via the packaging dimensions selection 804 and includes a warehouse function listing 1002, a data entry section 1004 for inputting shipping container dimensions, and an update button for submitting the dimensions.

Figure 11:
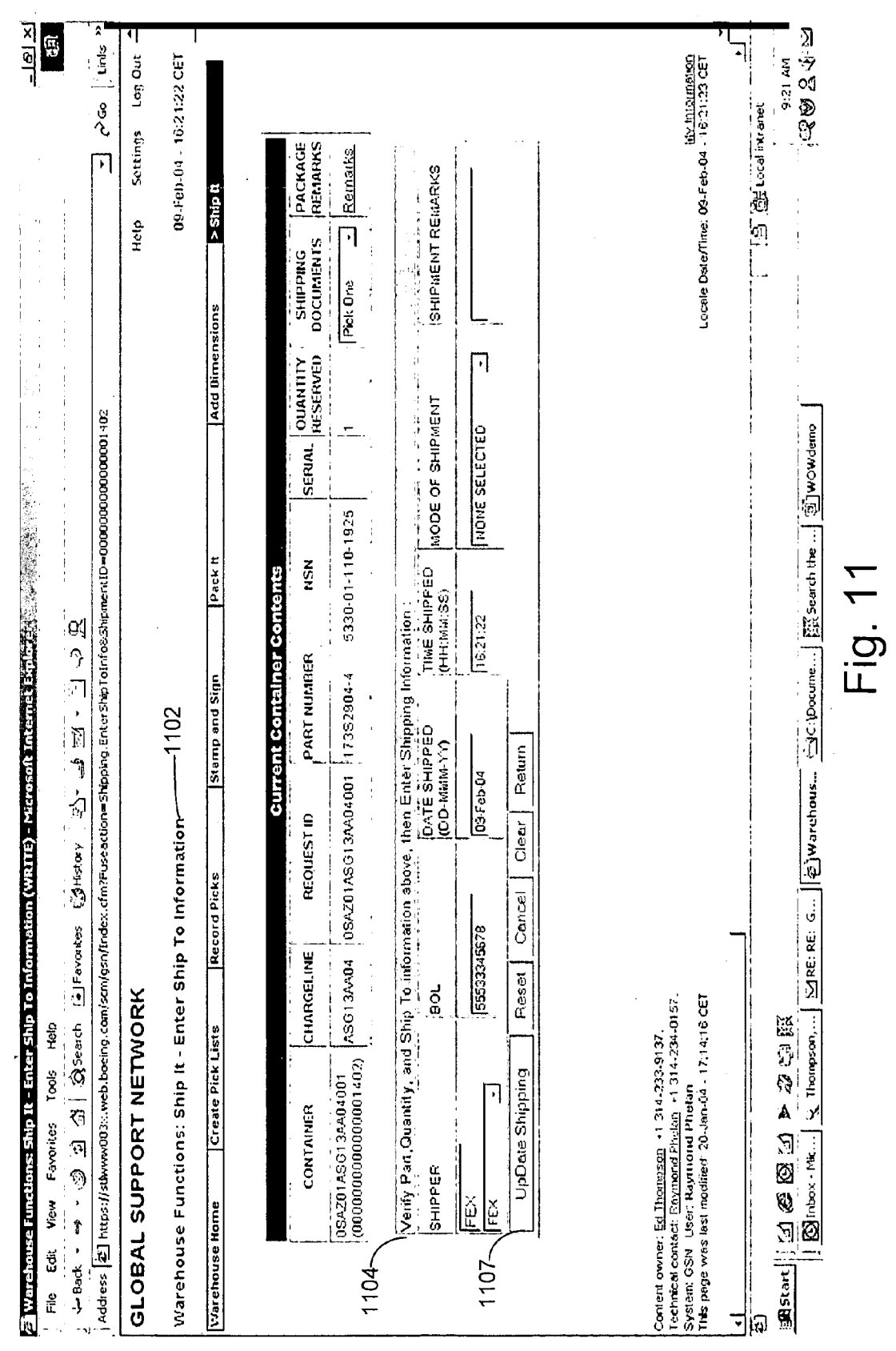

FIG. 11 illustrates another shipping input screen 1100 utilized in an illustrative embodiment of the invention. The input screen 1100 is accessed via the shipping selection 807 and includes a verification and shipping information section 1104 and an update shipping button 1107. A user 1110 with authorization to ship and update would have access to the update-shipping button 1107.

Figure 12:
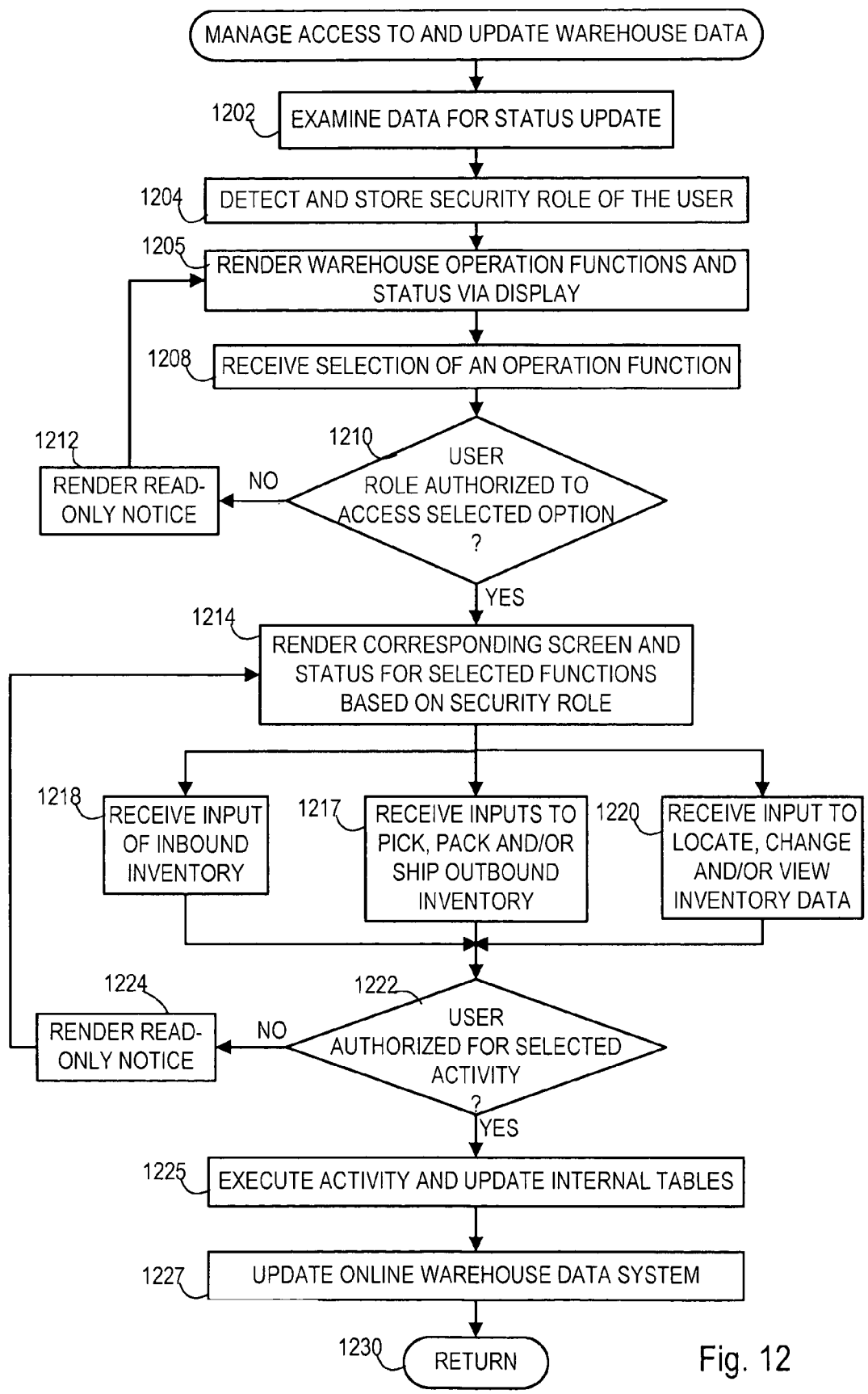
FIG. 12 illustrates an operational flow performed in managing access to and updating warehouse data associated with one or more online data systems according to an illustrative embodiment of the invention.

Referring now to FIGS. 1, 2, and 12, an operational flow 1200 performed in managing access to and updating warehouse data associated with one or more online data systems according to an illustrative embodiment of the invention, will be described. FIG. 12 is an illustrative routine or operational flow performed in managing access to and updating warehouse data according to illustrative embodiments of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 12 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The operational flow 1200 begins at operation 1202 where the WOW access application 124 examines data from the database 110 and the shipping tables 127 to update a status of warehouse operations.

Next at operation 1204, the WOW access application 124 detects and stores a security role 224 of the current user. Then at operation 1205, the WOW access application 124 renders warehouse operation functions and the status over the network 113 via a display such as the WOW display 142. The operational flow 1200 continues at operation 1208 where the WOW access application 124 receives a selection of a warehouse operation function.

Next at operation 1210 the WOW access application 124 determines whether the security role 224 detected is authorized to have access to the selection received. When the security role 224 is authorized the operational flow 1200 continues from operation 1210 to operation 1214 described below. When the security role is not authorized, the operational flow 1200 continues from operation 1210 to operation 1212. At operation 1212 the WOW access application 124 renders a read-only notice via an interface displayed on the user's computer, such as the WOW display 142. The operational flow then returns from operation 1212 to operation 1205 described above.

At operation 1214, the WOW access application 124 renders a screen corresponding to the selection received. The screen will also contain status information available. Next depending on the selected warehouse function, the operational flow continues from operation 1214 to operations 1218, 1217, or 1220. At operation 1218, the WOW access application 124 receives inputs associated with inbound inventory such as via the input screen 600. At operation 1217, the WOW access application 124 receives inputs associated with picking, packing, and/or shipping outbound inventory, such as via the input screens 700, 900, 1000, and 1100. And at operation 1220, the WOW access application 124 receives inputs associated with locating, changing, and/or viewing inventory data such as via the input screen 500.

Next the operational flow 1200 continues from operations 1218, 1217, or 1220 to operation 1222. At operation 1222 the WOW access application 124 determines whether the security role 224 detected is authorized to update or view the database 110 with the selection received. When the security role 224 is authorized the operational flow 1200 continues from operation 1222 to operation 1225 described below.

When the security role is not authorized, the operational flow 1200 continues from operation 1222 to operation 1224. At operation 1224 the WOW access application 124 renders a read-only notice via an interface displayed on the user's computer, such as the WOW display 142. The operational flow then returns from operation 1224 to operation 1214 described above.

At operation 1225, the WOW access application 124 executes the selected function or activity and updates the auxiliary tables 127. Then at operation 1227, the WOW access application 124 updates the online warehouse data system by updating the database 110 via the API 107. The operational flow 1200 then returns control to other routines at return operation 1230.

Thus, the present invention is presently embodied as methods, systems, computer program products or computer readable mediums encoding computer programs for managing access to and updating warehouse data in at least one online data system.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for managing access to and updating warehouse data in at least one online data system wherein a security role is established for each user of warehouse operation functions for the online data system, the method comprising:
examining warehouse data and updating a status of warehouse operations;
detecting a security role of a current user accessing the data system by determining a work responsibility role of the current user;
rendering one or more warehouse operation functions and the status via an interface;
receiving a selection of one of the warehouse operation functions;
determining whether the security role of the current user authorizes access to the warehouse operation function selected;
prohibiting access to the warehouse operation function selected in response to determining the security role does not authorize access to the warehouse operation function selected;
rendering a second interface corresponding to the warehouse operation function selected in response to determining the security role does authorize access to the warehouse operation function selected;
receiving input via the second interface to perform one or more of the warehouse operations;
executing the warehouse operations for which the input is received via the second interface;
updating at least one online data system based on the warehouse operations executed; and
generating one or more grief tables for storing items which cannot be received into the online data system;
tracking via the grief tables, the items which cannot be received into the online data system;
generating one or more auxiliary shipping tables for storing items in the process of being shipped; and
tracking via the auxiliary shipping tables at least one of intermediate issuing or intermediate shipping activity of one or more items between picking the items and final issuing or shipping of the items.

2. The method of claim 1, wherein prohibiting access to the warehouse operation function selected comprises rendering a read-only notice of via the interface.

3. The method of claim 1 wherein receiving input via the second interface to perform one or more of the warehouse operations further comprises displaying, at the second interface, tailored warehouse operation functionality accessible to the current user based on the security role therein excluding warehouse operation functionality inaccessible to the current user based on the security role.

4. The method of claim 1 wherein receiving input via the second interface to perform one or more of the warehouse operations further comprises displaying, at the second interface, warehouse operation functionality accessible to the current user based on the security role and warehouse operation functionality inaccessible to the current user based on the security role.

5. The method of claim 4, further comprising:
prohibiting access to perform the warehouse operations for which the input is received when the input is received for the warehouse functionality inaccessible to the current user based on the security role.

6. The method of claim 1 wherein executing the warehouse operations for which the input is received via the second interface comprises executing the warehouse operations for which the input is received when the input is received for the warehouse functionality accessible to the current user based on the security role.

7. The method of claim 6, further comprising:
tracking at least one of intermediate issuing or intermediate shipping activity of one or more items between picking the items and final issuing or shipping of the items; and
tracking one or more other items which cannot be received into the online data system.

8. The method of claim 1, wherein rendering the status comprises displaying at least one of a priority or a number of pending items associated with one or more of the warehouse operation functions wherein the priority comprises one of the following:
immediate action required;
action required; and
no action required.

9. The method of claim 1, wherein receiving input via the second interface to perform one or more of the warehouse operations comprises receiving a selection of at least one of the following:
receiving inbound inventory;
picking outbound inventory;
packing outbound inventory;
shipping outbound inventory;
locating inventory data;
changing inventory data; and
viewing inventory data.

10. The method of claim 1, wherein the work responsibility role comprises one of the following:
a warehouse worker authorized to access all warehouse operation functions;
a quality inspector authorized to record parts needing inspection;
a warehouse stocker authorized to record a final bin location of a part;
a warehouse picker of parts authorized to record parts as picked;
a warehouse shipper of parts authorized to record shipment information;
a warehouse issuer of parts authorized to perform an issue of part transaction; and
a warehouse data viewer authorized to view one or more warehouse data screens without update authorization.

11. The method of claim 10, wherein prohibiting access to the warehouse operation function selected comprises prohibiting access to a quality inspection receiving function in response to determining the work responsibility role comprises the warehouse shipper of parts which does not authorize access to the quality inspection receiving function.

12. The method of claim 10, wherein rendering a second interface corresponding to the warehouse operation function selected comprises displaying a receipt of stock input screen having a location and condition input field in response to determining the work responsibility role comprises the warehouse stocker of parts which does authorize access to the warehouse operation function selected; and
wherein receipt of stock information is retrieved by receiving and scanning at least one of an order number, a part number, or a purchase order number.

13. A computer program product comprising a computer-readable medium having control logic stored therein for causing a computer to manage access to and update warehouse data associated with at least one online data system wherein a security role is established for each user of warehouse operation functions for the online data system, the control logic comprising computer-readable program code for causing the computer to:
examine warehouse data and update a status of warehouse operations;
detect a security role of a current user accessing the data system;
render one or more warehouse operation functions and the status via an input screen;
receive a selection of one of the warehouse operation functions;
determine whether the security role of the current user authorizes access to the warehouse operation function selected;
tailor and render a second input screen based on the security role and the warehouse operation function selected in response to determining the security role does authorize access to the warehouse operation function selected wherein the second input screen excludes warehouse operation functionality irrelevant or inaccessible to the current user based on the security role;
execute the warehouse operations for which input is received via the second input screen;
update at least one online data system based on the warehouse operations execute; and
generate one or more grief tables for storing items which cannot be received into the online data system, and one or more auxiliary shipping tables for storing items in the process of being shipped, the control logic comprising computer-readable program code for causing the computer to execute the warehouse operations for which input is received, track via the auxiliary shipping tables at least one of intermediate issuing or intermediate shipping activity of one or more items between picking the items and final issuing or shipping of the items, track via the grief tables, the items which cannot be received into the online data system, and update multiple online data systems via application program interfaces based on the warehouse operations executed.

14. The computer program product of claim 13, further comprising computer-readable program code for causing the computer to prohibit access to the warehouse operation function selected in response to determining the security role does not authorize access to the warehouse operation function selected.

15. The computer program product of claim 13, further comprising computer-readable program code for causing the computer to:
track at least one of intermediate issuing or intermediate shipping activity of one or more items between picking the items and final issuing or shipping of the items; and
track one or more other items which cannot be received into the online data system.

16. A computer-implemented system for managing access to and updating warehouse data associated with at least one online data system wherein a security role is established for each user of warehouse operation functions associated with the online data system, the system comprising:
- an online data system server housing the online data system;
- a web server communicatively associated with the online data system server; and
- a remote computer including a display screen, the remote computer communicatively associated with the web server over a network, the web server operative to:
  - examine warehouse data and update a status of warehouse operations;
  - detect a security role of a current user accessing the warehouse data;
  - render via the display screen one or more warehouse operation functions and the status;
  - receive a selection of one of the warehouse operation functions via the remote computer;
  - determine whether the security role of the current user authorizes access to the warehouse operation function selected;
  - tailor and render one or more input interfaces via the display screen based on the security role in response to determining the security role does authorize access to the warehouse operation function selected wherein the input screens exclude warehouse operation functionality irrelevant to or inaccessible to the current user based on the security role;
  - execute the warehouse operations for which input is received via the second input screen; and
  - update at least one online data system based on the warehouse operations executed, the web server comprising one or more grief tables storing items which cannot be received into the online data system, and one or more auxiliary shipping tables storing items in the process of being shipped, the web server further operative to execute the warehouse operations for which input is received, track via the auxiliary shipping tables at least one of intermediate issuing or intermediate shipping activity of one or more items between picking the items and final issuing or shipping of the items, track via the grief tables, the items which cannot be received into the online data system, and update multiple online data systems via application program interfaces based on the warehouse operations executed.

17. The system of claim 16, wherein the remote computer comprises a wireless tablet personal computer (PC) and wherein the web server is further operative to prohibit access to the warehouse operation function selected in response to determining the security role does not authorize access to the warehouse operation function selected.

* * * * *